United States Patent
Coffey et al.

(10) Patent No.: US 7,971,099 B2
(45) Date of Patent: Jun. 28, 2011

(54) METHOD FOR ENABLING FASTER RECOVERY OF CLIENT APPLICATIONS IN THE EVENT OF SERVER FAILURE

(75) Inventors: Michael K. Coffey, Shokan, NY (US); Manjunath B. Muttur, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 12/061,185

(22) Filed: Apr. 2, 2008

(65) Prior Publication Data

US 2009/0254775 A1 Oct. 8, 2009

(51) Int. Cl.
*G06F 11/00* (2006.01)

(52) U.S. Cl. ............ 714/36; 714/3; 714/4; 714/10; 714/11; 714/12; 714/13; 714/15; 714/18; 714/48; 709/221; 709/223; 709/224

(58) Field of Classification Search .......... 714/3, 4, 714/10–13, 15, 18, 48; 709/221, 223, 224
See application file for complete search history.

(56) References Cited

U.S. PATENT DOCUMENTS

| | | | |
|---|---|---|---|
| 5,537,642 A | 7/1996 | Glowny et al. | 395/800 |
| 5,652,908 A | 7/1997 | Douglas et al. | 395/800 |
| 5,805,785 A | 9/1998 | Dias et al. | 395/182.02 |
| 5,963,963 A | 10/1999 | Schmuck et al. | 707/205 |
| 6,023,706 A | 2/2000 | Schmuck et al. | 707/200 |
| 6,189,111 B1 | 2/2001 | Alexander et al. | 714/8 |
| 6,223,231 B1 * | 4/2001 | Mankude | 710/38 |
| 6,523,130 B1 | 2/2003 | Hickman et al. | 714/4 |
| 6,651,242 B1 * | 11/2003 | Hebbagodi et al. | 717/127 |
| 6,675,217 B1 | 1/2004 | Dani et al. | 709/229 |
| 7,076,555 B1 * | 7/2006 | Orman et al. | 709/227 |
| 7,197,660 B1 | 3/2007 | Liu et al. | 714/4 |
| 7,251,745 B2 * | 7/2007 | Koch et al. | 714/11 |
| 7,401,256 B2 * | 7/2008 | Ishida | 714/21 |

(Continued)

FOREIGN PATENT DOCUMENTS

EP 1231756 A2 8/2002

(Continued)

OTHER PUBLICATIONS

R. Zhang, et al., "Efficient TCP Connection Failover in Web Server Clusters," IEEE 2004, pp. 1219-1228.

(Continued)

*Primary Examiner* — Robert Beausoliel
*Assistant Examiner* — Charles Ehne
(74) *Attorney, Agent, or Firm* — Justin Dillon, Esq.; Kevin P. Radigan, Esq.; Heslin Rothenberg Farley & Mesiti P.C.

(57) ABSTRACT

A system and method are provided for improving recovery times in fallover conditions in a multinode data processing system by sending notification of the failure of a server node, which is acting as server for a client application running on a client node, to the client application. In the present invention, this notification is provided by the fallover node acting as backup for the server node. When a client application receives no response from a server for a long time, it assumes that the server has failed and initiates reconnection. The present invention speeds-up the reconnect initiated by the client application by having system level software proactively notify the client application about the server failure. This results in faster recovery for client applications.

18 Claims, 2 Drawing Sheets

U.S. PATENT DOCUMENTS

| | | | |
|---|---|---|---|
| 7,668,962 B2 * | 2/2010 | Tran et al. | 709/230 |
| 2002/0087912 A1 | 7/2002 | Kashyap | |
| 2004/0111652 A1 * | 6/2004 | Shoaib et al. | 714/15 |
| 2004/0153700 A1 * | 8/2004 | Nixon et al. | 714/4 |
| 2004/0268175 A1 * | 12/2004 | Koch et al. | 714/4 |
| 2005/0086342 A1 | 4/2005 | Burt et al. | |
| 2006/0090097 A1 * | 4/2006 | Ngan et al. | 714/6 |
| 2006/0129666 A1 * | 6/2006 | Bohm et al. | 709/223 |
| 2007/0198710 A1 | 8/2007 | Gopalakrishnan | |
| 2009/0037763 A1 * | 2/2009 | Adhya et al. | 714/4 |

FOREIGN PATENT DOCUMENTS

EP        1892921 A2    2/2008

OTHER PUBLICATIONS

H. Bardsley, et al., "Dynamic Storage Subsystem Path Switching," TDB n11 04-90, pp. 168-169.

Notification of Transmittal of the International Search Report and the Written Opinion of the International Searching Authority, or the Declaration for PCT/EP2009/052803 dated Aug. 18, 2009.

* cited by examiner

METHOD FOR ENABLING FASTER RECOVERY OF CLIENT APPLICATIONS IN THE EVENT OF SERVER FAILURE

TECHNICAL FIELD

The present invention is generally directed to multinode data processing systems and methods. More particularly, the present invention is directed to a system and method for improving recovery time in the event of a server failure. Even more particularly, the present invention is directed to a system in which a fallover node provides failure notification as opposed to waiting for a determination of failure based on the lack of performance by the failed node. As used herein and in the appended claims, the terms "node" and "server" are used interchangeably, though it is understood that a server may include several nodes.

BACKGROUND OF THE INVENTION

In clusterware applications such as HACMP (High Availability Cluster Management Program), there exists many client applications which are intelligent enough to automatically reconnect to a backup server when the primary server fails. This is made possible by dynamically moving the IP (Internet Protocol) address of the primary server, with which a client was interacting, to the backup server. Accordingly, client applications do not have to be killed and/or restarted in response to a server failure. This capability of clusterware is referred to herein as "fallover." However, the problem is that, as soon as the primary server fails, the TCP (Transmission Control Protocol) connection existing between the client and the server takes some time to get terminated. This is primarily because client applications are unaware of the server failure and so the client application keeps retransmitting until the TCP retransmit counter expires, thus eventually terminating the TCP connection. Accordingly, it is seen that it takes a considerable amount of time for client applications to recognize the server failure event before attempting a reconnect to backup server.

From the above, it is therefore seen that there exists a need in the art to overcome the deficiencies and limitations described herein and above.

SUMMARY OF THE INVENTION

The delay described above is avoided by timely notification of the failure event to the client. The client reconnects as soon as it receives this notification about the server failure. The present invention provides a mechanism for speeding up the process of reconnection, to one or more backup servers within cluster, by a client application. To quickly terminate all of the TCP connections existing between the server (the presumably failed node) and the client, the client receives a RST (Reset Packet) for that TCP connection as soon as the server fails. Despite the failure of the node from which this RST packet is expected, the method of the present invention still generates this RST packet. To achieve this, as soon as the fallover happens, the fallover node (backup server) sends this RST packet to the client. In effect the fallover node pretends to be the failed node for the client.

In accordance with one embodiment of the present invention, a method for improving recovery in fallover conditions comprises the step of sending notification of the failure of a server node, which is acting as server for a client application running on a client node, to the client application. This notification is provided by the fallover node acting as backup for the server node.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

In a TCP connection every packet has a sequence number and "ACK" number which insures that data is properly ordered at the end of the transmission at the receiver. At any point of time, if a TCP receives a packet with incorrect sequence number or ACK number, then it immediately discards that packet. So, for any application "A" to be able to send packets on a TCP connection existing between two other applications "B" and "C," application "A" has to determine the sequence number, ACK number, and TCP header information for the next packet in the TCP sequence to be sent to the client. Similarly, for the backup server (fallover node) to be able to send a RST (Reset) packet to the client it has to determine the TCP header information for that RST packet. In a TCP connection, when either of the communicating parties dies without terminating the connection by sending a FIN packet (which is used in TCP to indicate an end of transmission) or RST packet, the other party begins to retransmit the old packets again. In the present invention, the fallover node receives some retransmitted packets from the client as soon as it acquires the IP address from the failed node. The backup server (fallover node) obtains TCP header (sequence number, etc.) information of the next packet in the sequence using the retransmitted packet it just received from the client. Using raw IP sockets, any application can handcraft a packet and send it on a TCP connection existing between two different applications. This newly crafted packet appears to be a genuine packet for the receiver since it thinks that it is sent by its peer application. In the present invention, clusterware such as HACMP handcrafts a RST packet using raw IP sockets and send it to the client. This RST packet breaks the old TCP connection immediately and hence a client can reconnect again quickly. In this invention, there is no need to change either the existing client applications or the TCP stack itself. Irrespective of whether the TCP connection is terminated by TCP connection time-out or by RST packet, the client application views it as abrupt termination and attempts a reconnect.

Figure 1:
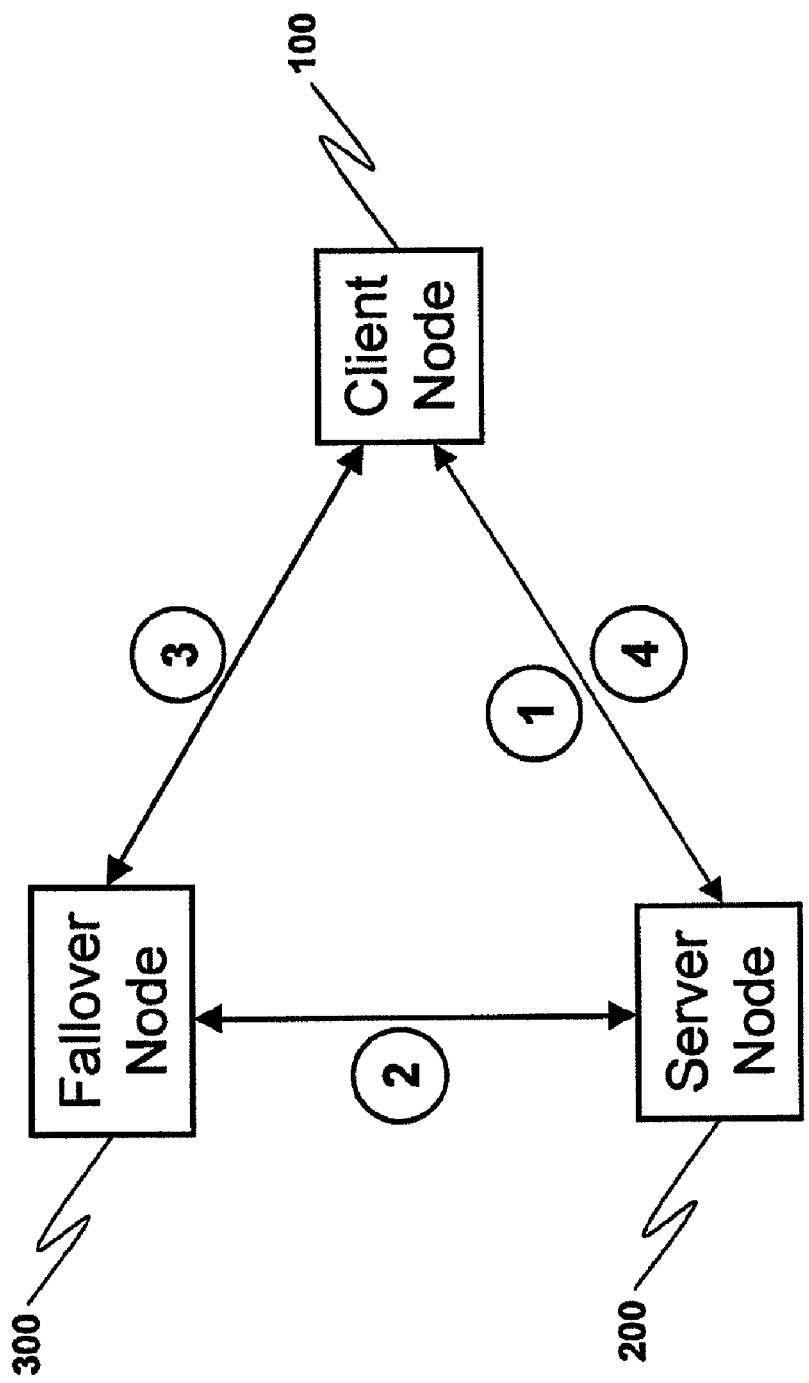
FIG. 1 is a block diagram illustrating the connections between a basic node configuration environment in which the present invention is employed and also illustrates a sequence of events that occurs in the operation of the present invention.

FIG. 1 illustrates a sequence of events or situations in the use of the present invention. In particular, the "1" in the circle indicates an initial state in which client node 100 is in communication with server node 200. The "2" in the circle indicates the event in which server node 200 fails and there is a failover to failover node 300. The "3" in the circle indicates the event in which failover node 300 communicates to client node 100 that server node 200 has failed and that it is taking over the communication function. The "4" in the circle indicates a final status in which client node 100 is now connected to failover node 300. The illustrated process avoids the necessity of an application running on client node 100 having to wait for an indication of failure for node 200 which is long in coming since application level software is not typically aware of node failures. The failover process, running at system level speeds and priorities occurs much faster and this fact along with the protocol structure of TCP connections allows a much faster notification to a client based server application.

Figure 2:
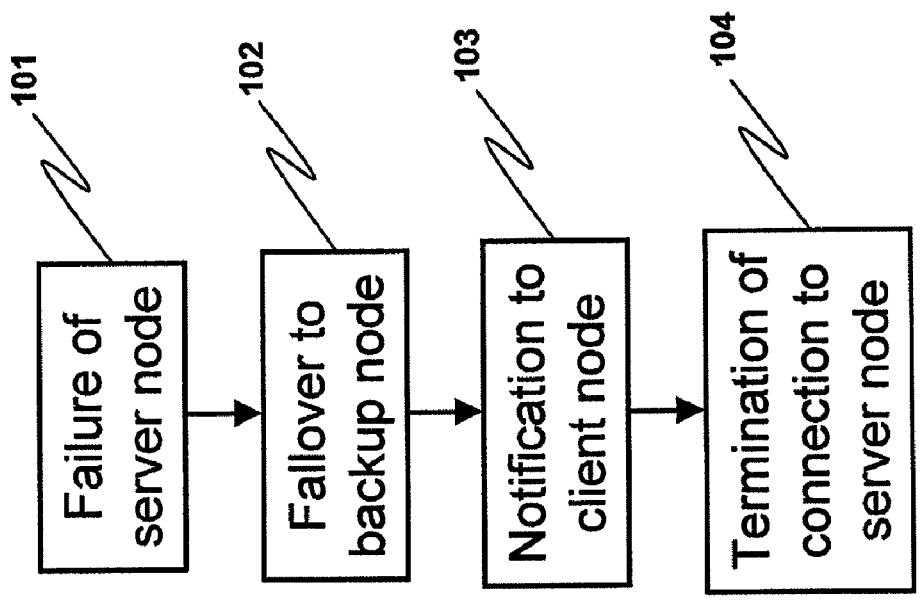
FIG. 2 is a flow chart illustrating a sequence of events that typically occurs in the process of the present invention.

FIG. 2 illustrates a typical sequence of events that occurs in the process of the present invention. The process is triggered by the failure of server node 200 (step 101). System level software detects this failure in a relatively rapid fashion and provides a failover to failover (or backup) node 300 (step 102). Failover node 300 then provides notification to client node 100 (step 103). Client node 100 then terminates the connection to node 200 (step 104).

The present invention also encompasses software in the form of machine readable instructions for carrying out the process recited herein. Furthermore, the present invention encompasses data processing systems having such instructions disposed within the memories thereof for carrying out the recited process.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A method for improving recovery in failover conditions, said method comprising:
    sending notification of failure of a server node, acting as server for a client application running on a client node, to said client application, said notification being provided by a failover node acting as backup for said server node;
    constructing a Reset packet at the failover node, the Reset packet to facilitate termination of a connection between the client node and the server node; and
    transmitting said Reset packet to said client application running on said client node.

2. The method of claim 1 further including the step of terminating connection to said server node.

3. The method of claim 1 further including the step of receiving, at said failover node, IP address information from said server node.

4. The method of claim 3 further including the step of receiving, at said failover node, retransmitted packets from said client node.

5. The method of claim 4 further including the step of obtaining, at said failover node, TCP header information.

6. The method of claim 5 in which said header information includes a packet sequence number.

7. The method of claim 1 in which said Reset packet construction uses raw sockets.

8. The method of claim 1 further including the step of terminating connection from said client node to said server node.

9. The method of claim 8 further including the step of attempting reconnection by said client application.

10. The method of claim 1 in which said server node and said client node are in communication via Transmission Control Protocol.

11. The method of claim 1 in which said failover node informs said client application running on said client node that said server node has failed.

12. The method of claim 11 in which said failover node also informs said client node that the failover node has taken over for said server node.

13. The method of claim 1 in which said method is triggered by failure of said server node.

14. The method of claim 1 in which said notification is provided earlier than if through a Transmission Control Protocol connection.

15. A multinode data processing system including at least three nodes containing program instructions in memory for said nodes, said multinode data processing system configured to perform a method, the method comprising:
    sending notification of failure of a server node, which is acting as server for a client application running on a client node, to said client application, said notification being provided by a failover node acting as backup for said server node;
    constructing a Reset packet at the failover node, the Reset packet to facilitate termination of a connection between the client node and the server node; and
    transmitting said Reset packet to said client application running on said client node.

16. The system of claim 15 in which said server node and said application running on said client node are initially connected through a Transmission Control Protocol connection.

17. A machine readable medium for improving recovery in failover conditions, the machine readable medium containing instructions thereon for performing a method, the method comprising:
    sending notification of failure of a server node, which is acting as server for a client application running on a client node, to said client application, said notification being provided by a failover node acting as backup for said server node;
    constructing a Reset packet at the failover node, the Reset packet to facilitate termination of a connection between the client node and the server node; and
    transmitting said Reset packet to said client application running on said client node.

18. The machine readable medium of claim 17 in which said server node and said application running on said client node are initially connected through a Transmission Control Protocol connection.

* * * * *